Feb. 18, 1941.   W. C. ANTHONY   2,232,197
TIPPING VEHICLE
Filed Aug. 18, 1939
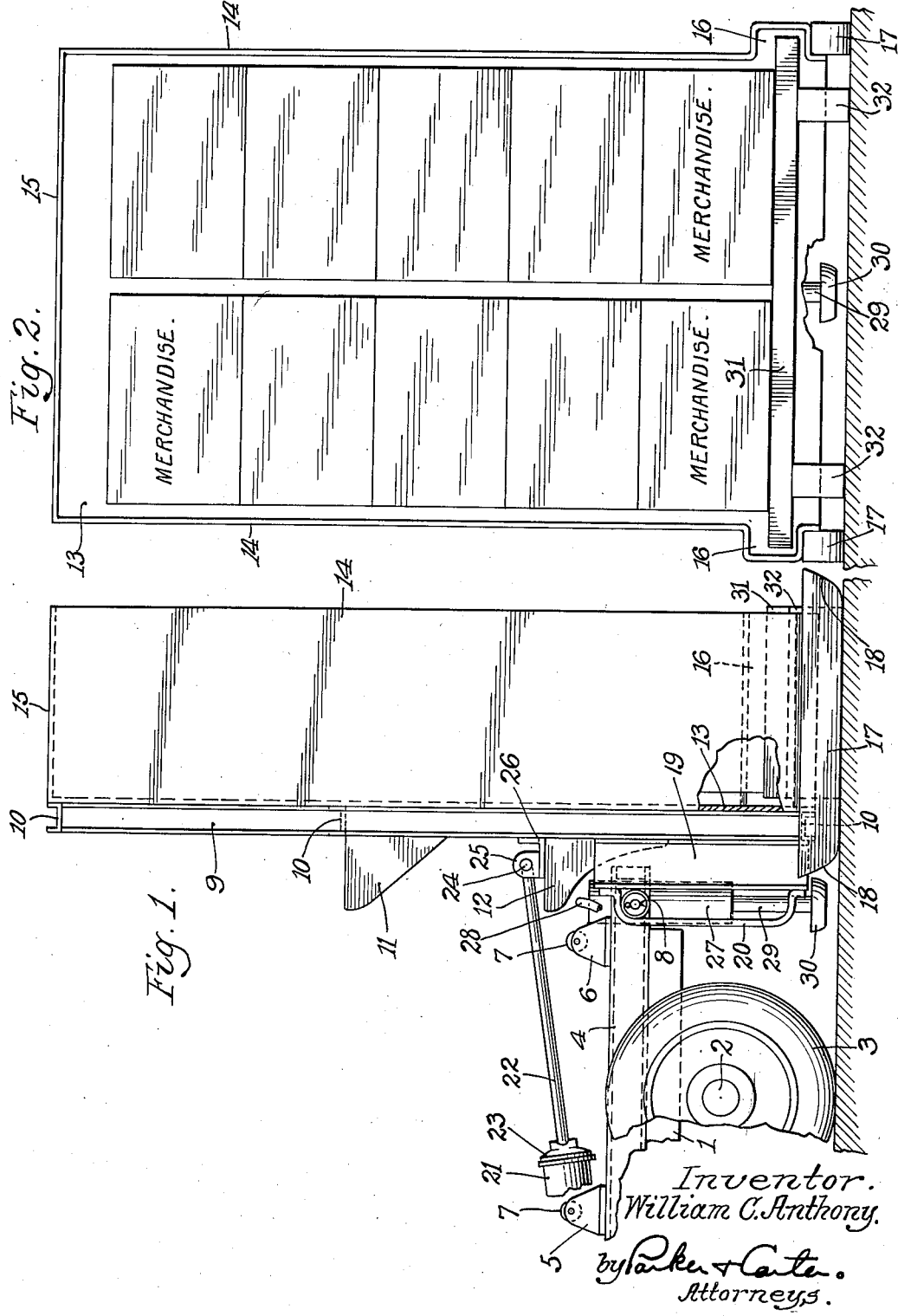
Inventor.
William C. Anthony.
by Parker & Carter.
Attorneys.

Patented Feb. 18, 1941

2,232,197

UNITED STATES PATENT OFFICE 2,232,197

TIPPING VEHICLE

William C. Anthony, Streator, Ill., assignor to Anthony Company, Streator, Ill., a corporation of Illinois Application August 18, 1939, Serial No. 290,766

10 Claims. (Cl. 214—77)

This invention relates to an apparatus for picking up, carrying and setting down loads. It has for one object to provide means for picking up a load as a unit and for setting it down as a unit. Another object is to provide a tipping or dumping truck or vehicle so arranged that it can pick up and put down a unitary load as a unit.

Other objects will appear from time to time in the course of the specification and claims.

The invention is illustrated more or less diagrammatically in the accompanying drawing, wherein:

Figure 1 is a side elevation with parts omitted, parts broken away and parts in section showing the mechanism in tipped position.

Figure 2 is an end elevation of the machanism shown in Figure 1.

Like parts are indicated by like symbols throughout the specification and drawing.

As shown the invention is embodied in a truck. It may be embodied in any desired type of truck. The particular form here shown comprises a truck frame illustrated generally as at 1. An axle 2 supports wheels 3. Other wheels, an engine and suitable transmission and controlling means are used. Their details form no essential part of the present invention and they are omitted. The tipping and pick up mechanism may, as in the form here shown, be mounted on a sub-frame 4, which includes preferably two or more longitudinal members and whatever cross members are necessary. On each side of the sub-frame are mounted two supports 5, 6 and in each of these is mounted a roller 7, 7. On each side of the sub-frame is mounted, preferably adjacent its rear, a roller 8.

A tipping frame is supported on the sub-frame and comprises longitudinal frame members 9 and suitable cross members 10. Mounted on each side of the tipping frame are cams 11 and 12 adapted to contact the rollers 7. In the form here shown, a receptacle is secured to the tipping frame and comprises a bottom or floor 13, side walls 14 and an end wall 15. Each of the end walls adjacent its rear end is shaped to provide an internal groove or gateway 16. At the rear end of each of the sides is mounted a shoe or runner 17 having preferably inclined or upwardly turned ends 18. The rear end of the tipping body thus described is preferably open. Secured to the frame members 9 is a pair of track members 19, one on each side of the vehicle. To each of these members is secured a retaining member 20 which encloses or surrounds its respective roller 8.

While the body may be tipped in any fashion or by any desired means it is convenient to do it hydraulically. For this purpose a cylinder 21 is mounted on the sub-frame. It contains a piston, not shown, from which a piston rod 22 extends outwardly from a cylinder head 23. At its outer end the piston rod 22 is pivoted as at 24 by a member 25 which is itself supported upon a member 26. This retainer may be a transverse member secured to the tipping frame. Pressure fluid is supplied to the cylinder 21 in any desired manner.

In some uses it is desirable to provide a means for supporting the rear of the vehicle at the time of tipping. In the form here shown this is accomplished by the use of a hydraulic cylinder 27 to which pressure fluid is supplied by a pipe 28 to operate a piston 29 within the cylinder 27. To the outer end of the piston rod 29 is secured a foot 30.

As a means for comprising the end of the body and supporting a load at the time of picking up and dumping a closure member 31 is used. This comprises merely a frame member which may be made in any desired manner. It is supplied with two or more ground contacting portions 32. The length of these ground contacting portions is preferably such that when the runners 17 contact the ground the under edge of the member 31 will clear the lower margins of the grooves 16. This relationship, although not essential, is convenient and desirable and is illustrated in Figure 2 in particular.

Although there is shown an operative form of the device, it will be understood that many changes in the form, shape and arrangement of parts might be made without departing from the spirit of the invention; and it is wished that this showing be taken as, in a sense, diagrammatic.

The use and operation of this invention are as follows:

The body, as shown, may be used as an ordinary vehicle body or as a dumping body or as a body arranged to pick up and to discharge or set down a load as a unit. Let it be assumed that the load has been piled on the ground as a unit. A series of boxes or other material rests on the platform 31, which has the supports 32 that rest upon the ground. An empty truck with the body shown is driven close to this pile of material. Pressure fluid is forced into the cylinder and tips the body. The body tips and runs to the rear as the cams 11 and 12 roll upon the rollers 7. It is guided in its tipping movement by the retaining members 20 as they engage the rollers 8. The body comes to the full tipped position with the runners 17 on the ground, and with its open top in line with the pile of material to be picked up. It is now moved to the rear about the pile of material until it completely surrounds it, as shown in the drawing. In this position, the edges of the material support 31 have fitted into the grooves 16. The runners 17 have assisted the movement of the body. The parts are now in position for raising. The pressure fluid is directed into the cylinder 21 on the side necessary to force the piston into the cylinder and to withdraw the piston rod 22 within the cylinder. As this movement goes on, the body is raised from the vertical position, pivoting briefly about the rollers 8; the cams 12 and 11 successively contact the rear and front rollers 7, and the body is moved to the upright or untipped position. In that position, the material platform 21 serves as a gate or closure for the end of the body.

With the load in the body as described, when it is desired to discharge it, the body is moved to the tipped position in which the supports 32 of the member 31 rest upon the ground. Then, with the load supported as a unit on the member 31 the truck is moved away. The body may be partially supported on the runners 17, which ride upon the ground; and when the body is clear of the discharged load, it is raised to the untipped position. Thus, by the means shown, a load may be discharged as a unit and left standing as a unit or a load which has been piled or arranged as a unit may be bodily picked up, and, of course, having once been picked up as a unit, may, if desired, be set down again as a unit.

For some purposes and where heavy loads are to be handled, it may be desirable to add a support in the direction of the tip. The cylinder 27, the piston rod 29 and the foot 30 indicate such a support. This is connected with pressure fluid, and when pressure is on the cylinder 21 to tip the body, pressure is in the cylinder 27 to force the foot outwardly. If the body returns to the untipped position, pressure is directed into the cylinder 27 to withdraw the foot. As shown, the foot 30 is not in contact with the ground because the body is not under the weight of the load. Figure 2 indicates that the load is entirely carried by the support 31, 32. If the body is now tipped as soon as the weight of the load comes onto the body—that is, as the lower part of the platform 31 contacts the outer edges of the grooves 16— the added weight will cause flexure of the vehicle springs and bring the foot in contact with the ground.

I claim:

1. In combination with a vehicle, a main structure, a platform mounted thereon for tipping with relation thereto, means for tipping said platform, a body mounted on said platform, said body having fixed side walls and an open end, a free load-supporting member, said member adapted, also, to serve as a removable tail gate for said body, said body formed to receive the edges of said load-supporting member or platform, there being ground-contacting members on said load supporting member positioned to hold the load supporting member out of contact with the ground, said load supporting member comprising a platform-like member adapted to support a load in a unitary pile separated from the body.

2. In combination with a vehicle, a main structure, a platform mounted thereon for tipping with relation thereto, means for tipping said platform, a body mounted on said platform, said body having an open end, and a plurality of ground-contacting runners secured to said body and positioned to contact the ground when the body is tipped, a load-supporting member, said member adapted, also, to serve as a tail gate for said body, said body formed to receive the edges of said load-supporting member, there being ground-contacting members on said load supporting member positioned to hold the load supporting member out of contact with the ground, said load supporting member comprising a platform-like member adapted to support a load in a unitary pile free from the body.

3. In combination with a vehicle, a main structure, a platform mounted thereon for tipping with relation thereto, means for tipping said platform, a body mounted on said platform, said body having fixed side walls and an open end, a load-supporting member, said member adapted, also, to serve as a tail gate for said body, said body formed to receive the edges of said load-supporting member when the body is in the tipped position, there being ground-contacting members on said load supporting member positioned to hold the load supporting member out of contact with the ground, said load supporting member comprising a platform-like member adapted to support a load in a unitary pile free from the body.

4. In combination with a vehicle, a main structure, a platform mounted thereon for tipping with relation thereto, means for tipping said platform, a body mounted on said platform, said body having an open end, and a plurality of ground-contacting runners secured to said body and positioned to contact the ground when the body is tipped, a load-supporting member, said member adapted also, to serve as a tail gate for said body, said body formed to receive the edges of said load-supporting member when the body is in the tipped position, there being ground-contacting members on said load supporting member positioned to hold the load supporting member out of contact with the ground, said load supporting member comprising a platform-like member adapted to support a load in a unitary pile free from the body.

5. In combination with a vehicle, a main structure, wheels therefor, a platform mounted thereon for tipping with relation thereto, hydraulic means for tipping said platform, a supporting cylinder positioned on said structure, means associated with said cylinder for forcing a ground-contacting foot outwardly toward the ground, a body mounted on said platform, said body having an open end, a load-supporting member, said member adapted, also, to serve as a tail gate for said body, said body formed to receive the edges of said load-supporting platform, there being ground-contacting members on said load support positioned to hold the load support out of contact with the ground, said load support comprising a platform-like member adapted to support a load in a unitary pile free from the body.

6. In combination with a vehicle, a main structure, wheels therefor, a platform mounted thereon for tipping with relation thereto, hydraulic means for tipping said platform, a supporting cylinder positioned on said structure, means associated with said cylinder for forcing a ground-contacting foot outwardly toward the ground, hydraulic connections between said tipping cylinder and said supporting cylinder whereby both are actuated together, a body mounted on said platform, said body having an open end, a load-supporting member, said member adapted, also, to serve as a tail gate for said body, said body formed to receive the edges of said load-supporting platform, there being ground-contacting members on said load support position to hold the load support out of contact with the ground, said load support comprising a platform-like member adapted to support a load in a unitary pile free from the body.

7. In combination with a vehicle, a main structure, wheels therefor, a platform mounted thereon for tipping with relation thereto, hydraulic means for tipping said platform, a supporting cylinder positioned on said structure, means associated with said cylinder for forcing a ground-contacting foot outwardly toward the ground, hydraulic connections between said tipping cylinder and said supporting cylinder whereby both are actuated together, a body mounted on said platform, said body having an open end, a load-supporting member, said member adapted, also, to serve as a tail gate for said body, said body formed to receive the edges of said load-supporting platform when the body is in the tipped position, there being ground-contacting members on said load support positioned to hold the load support out of contact with the ground, said load support comprising a platform-like member adapted to support a load in a unitary pile free from the body.

8. In combination with a vehicle, a main structure, wheels therefor, a platform mounted thereon for tipping with relation thereto, hydraulic means for tipping said platform, a supporting cylinder positioned on said structure, means associated with said cylinder for forcing a ground-contacting foot outwardly toward the ground, hydraulic connections between said tipping cylinder and said supporting cylinder whereby both are actuated together, a body mounted on said platform, said body having an open end, and a plurality of ground-contacting runners positioned to contact the ground when the body is tipped, a load-supporting member, said member adapted, also, to serve as a tail gate for said body, said body formed to receive the edges of said load-supporting platform, there being ground-contacting members on said load support positioned to hold the load support out of contact with the ground, said load support comprising a platform-like member adapted to support a load in a unitary pile free from the body.

9. In combination with a vehicle, a main structure, wheels therefor, a platform mounted thereon for tipping with relation thereto, hydraulic means for tipping said platform, means for causing bodily movement of the frame with relation to the structure in addition to the tipping, a supporting cylinder positioned on said structure, means associated with said cylinder for forcing a ground-contacting foot outwardly toward the ground, hydraulic connections between said tipping cylinder and said supporting cylinder whereby both are actuated together, a body mounted on said platform, said body having an open end, and a plurality of ground-contacting runners positioned to contact the ground when the body is tipped, a load-supporting member, said member adapted, also, to serve as a tail gate for said body, said body formed to receive the edges of said load-supporting platform when the body is in the tipped position, there being ground-contacting members on said load support positioned to hold the load support out of contact with the ground, said load support comprising a platform-like member adapted to support a load in a unitary pile free from the body.

10. In combination with a vehicle, a main structure, wheels therefor, a platform mounted thereon for tipping with relation thereto, hydraulic means for tipping said platform, means positioned partially on the platform and partially on the structure for causing bodily movement of the frame with relation to the structure in addition to the tipping, a supporting cylinder positioned on said structure, means associated with said cylinder for forcing a ground-contacting foot outwardly toward the ground, hydraulic connections between said tipping cylinder and said supporting cylinder whereby both are actuated together, a body mounted on said platform, said body having an open end, and a plurality of ground-contacting runners positioned to contact the ground when the body is tipped, a load-supporting member, said member adapted, also to serve as a tail gate for said body, said body formed to receive the edges of said load-supporting platform when the body is in the tipped position, there being ground-contacting members on said load support positioned to hold the load support out of contact with the ground, said load support comprising a platform-like member adapted to support a load in a unitary pile free from the body.

WILLIAM C. ANTHONY.